Dec. 6, 1932.   H. HORT   1,890,293
STEERING GEAR FOR WATER AND AIR VEHICLES
Filed Jan. 30, 1931   2 Sheets-Sheet 1
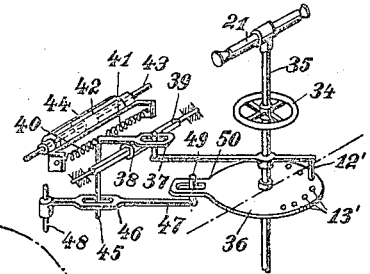
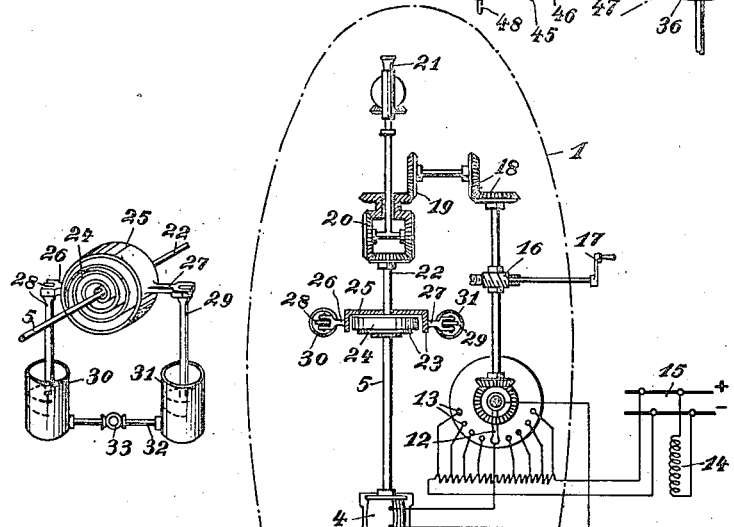
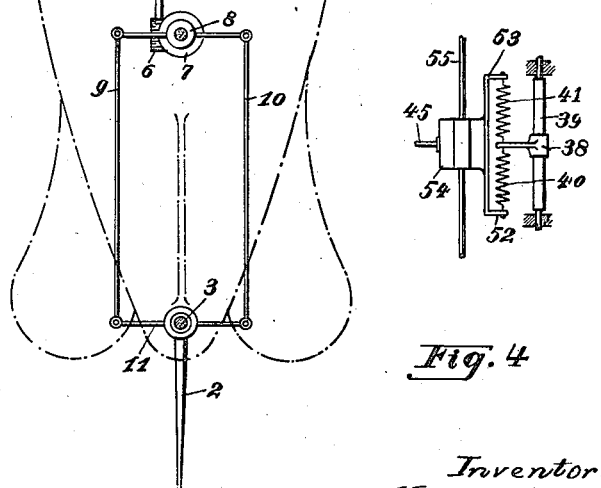
Inventor:
Hermann Hort
by
Lorra & Kehlenbeck
Attorneys.

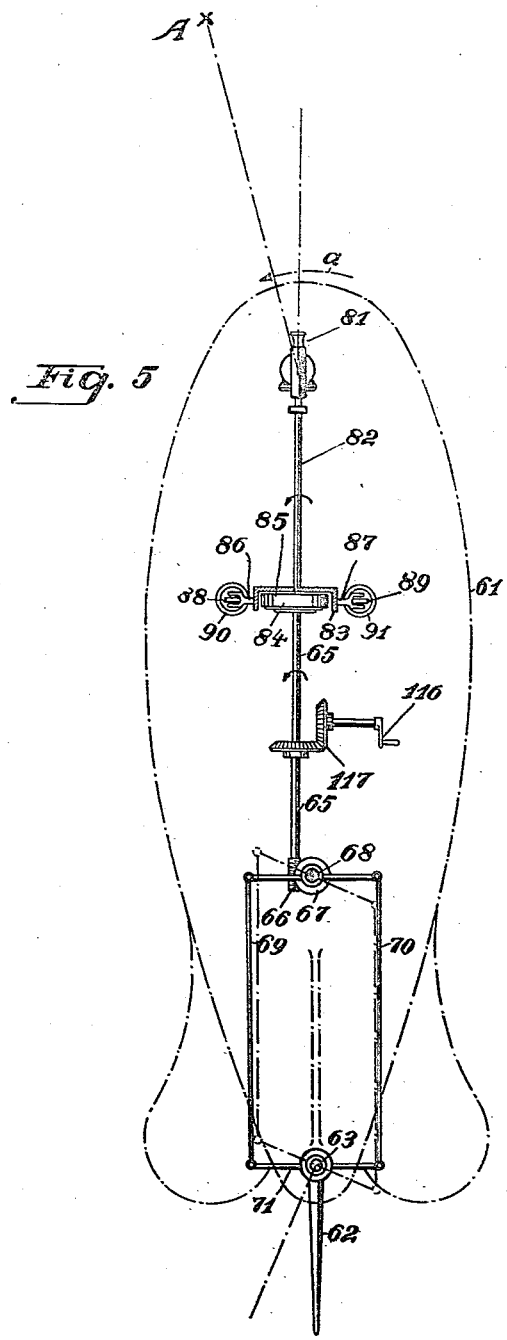

Patented Dec. 6, 1932

1,890,293

UNITED STATES PATENT OFFICE

HERMANN HORT, OF BERLIN-NEUWESTEND, GERMANY, ASSIGNOR TO GESELLSCHAFT FÜR ELEKTRISCHE APPARATE, M. B. H., OF BERLIN-MARIENFELDE, GERMANY, A CORPORATION OF GERMANY

STEERING GEAR FOR WATER AND AIR VEHICLES

Application filed January 30, 1931, Serial No. 512,233, and in Germany January 10, 1930.

I have filed application in Germany on January 10th, 1930, No. 65 a G. 17.30.

My present invention relates to mechanism for operating the rudder of a water craft or an aircraft according to the position of a course-indicator, such as, for instance, a compass, or a telescope adjustable to the direction of the course. In mechanism of this character, it is necessary that the motions of the rudder and of the course-indicator should be out of time or out of phase with each other, in order that the rudder may be operated in such a manner as to avoid swinging the craft, owing to its inertia, beyond the intended course.

In accordance with my invention, the mechanism by which the motion of the course-indicator is caused to affect the rudder or its drive, includes an accumulator of angular motion which as it were stores the rudder deviations or the motions of the course-indicator which correspond to the deviations from the course, said accumulator then transmitting such motions with a definite time lag, whereby the rudder deviations and the course deviations will be given the desired out-of-phase or out-of-time relation.

In its simplest embodiment, the invention contemplates direct manual adjustment of the rudder, such adjustment actuating at the same time the accumulator of angular motion and being transmitted by such accumulator, with a time lag, to the course-indicator, for instance a telescope adjustable to the direction of the course. The said accumulator may be constructed in different ways, two types of such accumulator being illustrated in the accompanying drawings. One of these types comprises a spirally coiled flat spring the inner end of which receives the motion to be stored while its outer end is secured to a casing the motion of which is damped by hydraulic cylinders or dash-pots connected with said casing. The angular motions are, as it were, stored in the spiral spring and transmitted to the casing and a shaft connected therewith, with a time lag which depends on the strength of the damping action of said cylinders. For this damping action, I may employ two hydraulic cylinders connected by an equalizing conduit which contains a throttle valve by the adjustment of which the damping action may be regulated. Thus the damping action and the phase-shifting resulting therefrom, may be adapted readily to the travel conditions prevailing at the time, such as wind, waves, etc. My invention is particularly suitable for the steering of dirigible airships and of small boats in accordance with the setting of a telescope adjustable by hand to the direction of the desired course.

In the drawings affixed to my specification and forming part thereof two embodiments of my invention are illustrated by way of example. In the drawings Fig. 1 shows one embodiment of my invention, in diagram, Fig. 2, a detail of Fig. 1, on a larger scale, Fig. 3, a somewhat modified steering gear, Fig. 4, a further detail of Fig. 1, on a larger scale, and Fig. 5, a further embodiment of my invention.

Referring to Fig. 1 of the drawings, 1 is the hull of an airship or dirigible with the rudder 2, in plan. The adjustment of the rudder 2 around the axis 3 takes place by the rudder motor 4 through the shaft 5, worm 6, worm-wheel 7, connecting rods 9 and 10 and lever 11. The motor 4 is by a potential divider connection with switch arm 12 and counter contacts 13 controlled in its armature circuit; the exciting winding 14 of the motor 4 as well as the controller 12 is connected to the supply 15. The operation of the switch arm 12 which is shown in its zero position takes place by a worm gear 16, from the crank 17, by means of which across bevel wheels 18 and 19 and differential gear 20 the telescope 21 is in the horizontal direction permanently pointed in the direction in which the airship should travel.

On the differential gear 20 also acts through the shaft 22 the hydraulic accumulator of motion 23 the spring portion of which is driven by the motor shaft 5. In order that the motor 4 should not overdrive the rudder gear 8–11 or the accumulator of motion 23 in the event of steering mistakes, slotted link drives are preferably interposed between the motor 4 and the rudder gear on the one hand and the accumulator of motion on the other hand. Limit switches for the rudder 2 may, in likewise not illustrated manner, be provided, which disconnect the motor 4 automatically in case of "hard up" positions of the rudder.

The hydraulic accumulator of motion is separately shown in Fig. 2 in perspective view. It consists substantially of a spirally coiled leaf spring 24, the inner end of which is attached to the motor shaft 5, while the outer end is fastened to the shaft 22. At both sides of the spring housing 25 are provided arms 26 and 27 at the free ends of which are pivotally secured the piston rods 28 and 29 of the damping cylinders 30 and 31. These cylinders are filled with liquid and in communication with each other by an equalizing pipe 32 fitted with an adjustable throttling valve 33. Although a manually adjustable throttle valve could be employed, a throttle valve controlled by spring or liquid pressure and which opens and closes automatically is preferably used.

In the modification of the steering gear according to Fig. 1 illustrated in Fig. 3 of the drawings, the telescope 21 is rotatable around the vertical spindle 35 by means of the handwheel 34. Upon the spindle 35 is rotatably mounted a disk 36 with the counter contacts 13' of the potential divider for the armature circuit of the motor 4. The switch arm 12' is rigidly mounted upon the spindle 35 and engages a slotted link 37 secured to a slide 38 movable rectilinearly lengthwise of a guide 39. By this slotted link the angular movements of the telescope 21 are also transmitted to the accumulator of motion 23, the slotted link correspondingly stretching and compressing the springs 40 and 41 whereby the hydraulic damping cylinder 42 attached to the outer ends of the springs is caused to slide upon the stationary piston rod 43 parallel to the guide 39 and carrying pistons 44. To the cylinder 42 is secured a pin 45 engaging a guide slot 46 of the rocking arm 47 and turning the arm around the stationary spindle 48 in correspondence with the movements of the damping cylinder 42. The arm 47 which by means of the pin 49 engages the guide slot 50 of the disk 36 thus turns the disk and consequently the counter contacts 13'.

In the mechanism illustrated in Fig. 1 of the drawings the angular displacement of the motor 4 is thus utilized for operating the accumulator of motion, while in the mechanism shown in Fig. 3 the angular displacement of the telescope is utilized for this purpose. It is, furthermore, also possible to allow both angular displacements in unison to act upon the accumulator of motion by the aid of differential gears or the like.

In Fig. 4 of the drawings is illustrated an accumulator of motion similar in construction to the one shown in Fig. 3.

The slide 38 moving along the guide 39 again stretches or compresses the springs 40 and 41 which by means of the brackets 52 and 53 attached to their outer ends actuate the weight 54 adapted to slide upon the guide 55 parallel to the guide 39. This weight 54 again operates the rocking lever 47 shown in Fig. 3 by means of the pin 45.

The mode of operation of my improved steering gear will now be described with reference to the embodiment illustrated in Fig. 1 of the drawings. Assuming that it is desired to proceed along a new course, the telescope 21 is then set in the direction of the new course by means of the crank 17, the switch arm 12 being simultaneously adjusted so that the motor 4 is switched on and swings the rudder 2 over correspondingly. The ship is thereby turned to follow the new course. It is, however, necessary to turn the telescope 21 back relatively to the point steered for, in order to keep it constantly in the direction of the new course. Up to the moment in which the ship attains the new course, in correspondence with the part of the motor movement received from the accumulator of motion 23, the turning back motion given to the telescope by the crank is greater than the previous rotation of the hand crank 17 by which the telescope was directed at the new mark. The arrangement is such that the movement received from the accumulator by the shaft 22 is in the differential gear 20 subtracted from the turning back motion initiated by the hand crank 17. At the moment when the ship attains the new course the switch arm 12 does not stand in the reversing position shown in the drawings but has already passed beyond this position by an angle corresponding with the movement of the shaft 22.

The motor 4 has thus already reversed the rudder 2 before the ship has attained the new course, as is necessary for steady steering. By a proper adjustment of the throttle valve 33 in the connecting pipe of the damping cylinders of the accumulator of motion the result may be obtained that the rudder has at this moment already been swung to the opposite side by a small angle, whereby the turning impulse which the mass of the ship possesses on attaining the new course is braked so that the ship swings only slightly beyond the new course. The same operation as described above for turning the ship into the new course is then repeated in order to remove this small course deviation angle towards the other side, so that the ship very soon steadily follows the true course.

It will be readily understood that the described constructions may, of course, be modified or amplified as may appear necessary or desirable in specific cases. The telescope might, for instance, be controlled by a stationary mark on board ship; steering by the compass would likewise be possible. The accumulator of motion could without departing from the broad idea of my invention naturally also be operated from the rudder since its paths correspond with those of the motor. The same arrangement as illustrated in Fig. 1 for the horizontal steering might naturally also be employed for the vertical steering of airships.

In the embodiments of my invention described above a source of current is required for laying the rudder which source of current is adapted to be regulated in dependence of the magnitude of the course deviations and the sum for the time being of the rudder deflections in regard to the duration of these deflections.

In many cases, for instance in aircraft, motor boats and the like there is, as a rule, no special source of power for operating the rudder available on board, because such a plant would cause considerable extra costs or in some cases would constitute an objectionable extra load on the vehicle. In such cases the operation of the rudder is preferably effected by hand, instead of by a steering gear, and in such a manner that the accuracy and adaptability of the control as described above is not adversely affected thereby. More particularly this may be attained by turning the rudder with the aid of a drive which simultaneously adjusts a telescope or the like indicating the course by the aid of an accumulator of motion.

An embodiment of this feature of my invention is illustrated in Fig. 5 of the drawings. The rudder 62 of the airship 61 indicated in its outlines is adjustable around the axis 63 by means of the crank 116 through bevel wheels 117, shaft 65, worm 66, wormwheel 67, connecting rods 69 and 70 and lever 71. The shaft 65 operates, in the same manner as described with reference to Fig. 1 of the drawings, an accumulator of motion 83 by turning the inner end of a spirally wound leaf spring 84 of this accumulator of motion. The outer end of this spring 84 is attached to the housing or box 85 of the spring 84 which housing is rigidly mounted on the shaft 82. At both sides of this housing or box 85 are mounted arms 86 and 87 to the ends of which are hinged the piston rods 88 and 89 of the damping cylinders 90 and 91. These cylinders are filled with liquid and in communication one with the other by an equalizing pipe into which is fitted an adjustable throttle valve as in Fig. 2. The shaft 82 transmitting the resulting motion of the accumulator of motion 83 directly sets the telescope 81.

To explain the mode of operation of my improved steering gear more fully, it may be assumed that the ship from travelling straight ahead is to follow a new course, for instance a course towards the point A. The steersman then sets the telescope 81 in the direction of this point A by operating the crank 116. During this short-time adjusting movement the crank movement acting upon the accumulator of motion is considerably greater than the resulting motion of the accumulator of motion 83 serving for the adjustment of the telescope, so that the blade of the rudder is swung over considerably farther than corresponds with the deviation from the true course. The ship is thus at the beginning very sharply turned in the direction of the new course. Since, however, after the first adjustment from the crank 116 the telescope is turned still further in the same direction by the accumulator of motion and simultaneously also turns the ship into this direction the steersman must now turn the crank back quicker than usual in order to keep the point A within the telescope so that the blade of the rudder 62 is again turned back into its zero position before the ship has reached the new course. By a generally single adjustment of the throttle valve between the damping cylinders 90 and 91 the damping constant of the accumulator of motion 83 may be adapted to the steering conditions obtaining at the time so that when the new course is attained by the ship the rudder blade 62 is already swung back to the opposite side by a small angle so that the turning impulse which the ship possesses on attaining the new course is effectively braked. Compared with the manual steering gear for rudders of water craft or aircraft the advantage obtained by interposing the accumulator of motion is that in the case of large deviations from the true course the effect of the rudder is increased and on turning the ship back to the course is rapidly decreased and finally when the desired course has been attained becomes negative with a force corresponding substantially with the turning impulse of the craft.

It will be readily understood that structural modifications may be made without departing from the spirit of my invention or the ambit of the appended claims.

I claim as my invention:

1. Steering gear for aircraft and water craft, comprising a course-indicator, a rudder, an operative connection between said course-indicator and said rudder, such connection including an accumulator of angular motion to secure an out-of-phase relation between the movements of the course-indicator and of the rudder, and independent means for actuating said rudder.

2. Steering gear for aircraft and water craft, comprising a sighting device, a rudder, a motor for actuating said rudder, an operative connection between said motor and said sighting device, such connection including an accumulator of angular motion, a regulating device for said motor, manually operated means for adjusting said regulating device, and an operative connection between said means and the sighting device.

3. Steering gear for aircraft and water craft, comprising a sighting device, a rudder, a motor for actuating said rudder, an operative connection between said motor and said sighting device, such connection including an accumulator of angular motion, responsive to said motor, and differential gearing interposed between said accumulator and said sighting device, a regulating device for said motor, and manually operated means, operatively connected with said differential gearing, or adjusting said regulating device.

4. Steering gear for aircraft and water craft, comprising a sighting device adjustable to the direction of the desired course, a rudder, manually operated means for adjusting said rudder, and an operative connection between said sighting device and said means, such connection including an accumulator of angular motion.

5. Steering gear according to claim 1, in which the accumulator of angular motion consists of a spiral spring in the inner end of which is operatively connected with the rudder, a casing to which the outer end of said spring is secured, a damping cylinder, a piston in said cylinder, a piston rod connecting said piston with said casing, and a shaft secured to said casing co-axially with the spring and transmitting, with a time lag, the motion stored by said spring.

6. Steering device according to claim 1, in which the accumulator of angular motion consists of a spiral spring the inner end of which is operatively connected with the rudder, a casing to which the outer end of said spring is secured, two hydraulic cylinders, pistons in said cylinders, piston rods connecting said pistons with opposite sides of said casing, a conduit connecting said cylinders, and a throttle valve in said conduit.

7. Steering gear for aircraft and water craft, comprising a course-indicator, a rudder, a motor for actuating said rudder, a regulating device for said motor, and an operative mechanical connection between said indicator and said regulating device, said connection including a mechanical tension storing member connected at different points with the indicator and with the regulating device respectively.

8. Steering gear for aircraft and water craft, comprising a movable course-indicator, a rudder, a motor for actuating said rudder, a regulating device for said motor, and separate operative connections from said regulating device to the said course-indicator and said motor respectively, one of said connections including an elastic member to transmit motion with a time lag and secure an out-of-phase relation between the movement of the course-indicator and of the rudder.

9. Steering device for aircraft and water craft, comprising two elements, viz.: a movable course-indicator and a rudder, a motor for actuating said rudder, a movable controller for said motor, and an operative mechanical connection between one of the two first-mentioned elements and said controller, said connection including a mechanical tension storing member to transmit motion with a time lag and secure an out-of-phase relation between the movements of the course-indicator and of the rudder.

10. Steering gear for aircraft and water craft, comprising a movable course-indicator, a rudder, a motor for actuating said rudder, an operative connection between said course-indicator and said motor, such connection including an elastic member to transmit motion with a time lag, a regulating device for said motor, manually operated means for adjusting said regulating device, and an operative connection between said means and the course-indicator.

11. Steering gear for aircraft and water craft, comprising a movable course-indicator, a rudder, a motor for actuating said rudder, an operative connection between said course-indicator and said motor, such connection including an elastic member to transmit motion with a time lag, and also including differential gearing interposed between said member and said course-indicator, a regulating device for said motor, and manually operated means, operatively connected with said differential gearing, for adjusting said regulating device.

12. Steering gear for aircraft and water craft, comprising a movable course-indicator, a rudder, manually operated means for adjusting said rudder, and an operative mechanical connection between said course-indicator and said means, such connection including a mechanical tension storing member to transmit motion with a time lag.

In testimony whereof I affix my signature.

HERMANN HORT.